E. M. KRUEGER.
WATER METER SPINDLE.
APPLICATION FILED JULY 22, 1918.
1,328,879.
Patented Jan. 27, 1920.
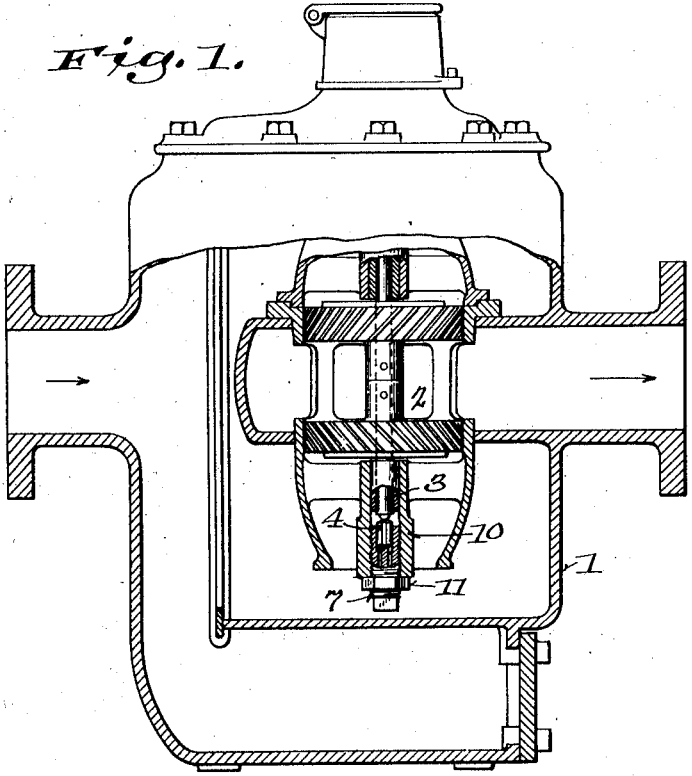
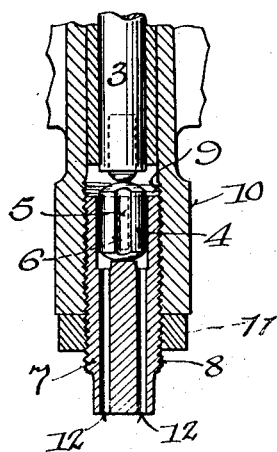
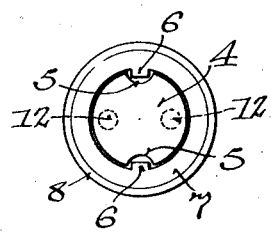
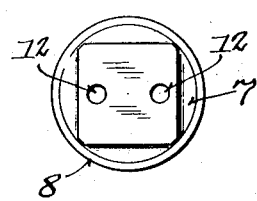
Inventor
Emil M. Krueger
By Erwin J. Wheeler
Attorneys.

UNITED STATES PATENT OFFICE.

EMIL M. KRUEGER, OF MILWAUKEE, WISCONSIN, ASSIGNOR TO BADGER METER MANUFACTURING COMPANY, OF MILWAUKEE, WISCONSIN, A CORPORATION OF WISCONSIN.

WATER-METER SPINDLE.

1,328,879.

Specification of Letters Patent.   Patented Jan. 27, 1920.

Application filed July 22, 1918.   Serial No. 246,152.

*To all whom it may concern:*

Be it known that I, EMIL M. KRUEGER, a citizen of the United States, residing at Milwaukee, county of Milwaukee, and State of Wisconsin, have invented new and useful Improvements in Water-Meter Spindles, of which the following is a specification.

My invention relates to improvements in the bearing supports of water meters and the like, and the same is explained by reference to the accompanying drawings, in which—

Figure 1 represents a side view, part in section, of one form of meter in which my device is used.

Fig. 2 is an enlarged view of the supporting bearing.

Fig. 3 is a top view and

Fig. 4 is a bottom view of the bearing.

Like parts are represented by the same reference numerals throughout the several views.

Referring to Fig. 1:

1 is a meter case of ordinary construction and the same is provided with a revoluble wheel 2, which is also of ordinary construction. The meter wheel 2 is securely supported upon the shaft 3 in the ordinary manner. Heretofore the shaft 3 has been supported at its lower end upon a spherical ball which ball was free to revolve in all directions in its bearings. By my improvement, the shaft 3 is supported at its lower end upon the elongated agate or other bearing 4, which agate or other bearing is provided with one or more grooves 5 which are adapted to fit partially around the longitudinal vertical beads 6, which beads 6 are formed in the tubular sleeve 7. The sleeve 7 is provided on its periphery with screw threads 8, which threads 8 engage in corresponding threads 9, formed in the tubular sleeve 10, whereby as said agate or bearing 4 becomes worn, it can be adjusted higher or lower by the adjustment of the tubular member 7 in the tubular member 10. 11 is a lock nut which is turned up against the tubular member 10, whereby said member 7 is securely retained at any desired point of adjustment. The agate 4 is prevented from revolving by the beads 6, which engage in the vertical grooves 5. 12, 12 are vertical ducts through which sand or any other refuse matter which may possibly accumulate around the agate is free to escape from said sleeve 7. It will be obvious that when one end of said agate becomes worn by the revoluble movement of the shaft 3 thereon, said agate may be removed inverted and replaced in its bearings, whereby the life of the wearing parts is prolonged.

Having thus described my invention, what I claim as new and desire to secure by Letters Patent, is:

1. In a device of the described class, the combination with the wheel-supporting shaft, an adjustable cylindrical support, said support being provided with a pair of beads, and an elongated anti-friction bearing, said elongated bearing being provided with grooves for the reception of said beads.

2. In a device of the described class, the combination with the wheel-supporting shaft, an adjustable cylindrical support, said support being provided with a pair of beads, and an elongated anti-friction bearing, said elongated bearing being provided with grooves for the reception of said beads, and said cylindrical support being provided with a plurality of vertical ducts for the escape of refuse matter from said bearings.

In testimony whereof I affix my signature in the presence of two witnesses.

EMIL M. KRUEGER.

Witnesses:
O. C. WEBER,
JAS. B. ERWIN.